US010093532B2

(12) United States Patent
Ballard et al.

(10) Patent No.: US 10,093,532 B2
(45) Date of Patent: Oct. 9, 2018

(54) NOZZLE AND KEYED FLUSH FACE RECEIVER

(71) Applicant: Flomax International, Inc., Springville, UT (US)

(72) Inventors: Mark Paul Ballard, Pleasant Grove, UT (US); Carl Paul Ballard, Lindon, UT (US); John Trent Kendrick, Mapleton, UT (US)

(73) Assignee: FLOMAX INTERNATIONAL, INC., Springville, UT (US)

( * ) Notice: Subject to any disclaimer, the term of this patent is extended or adjusted under 35 U.S.C. 154(b) by 444 days.

(21) Appl. No.: 14/826,945

(22) Filed: Aug. 14, 2015

(65) Prior Publication Data
US 2016/0046479 A1     Feb. 18, 2016

Related U.S. Application Data

(60) Provisional application No. 62/037,598, filed on Aug. 14, 2014.

(51) Int. Cl.
*B67D 7/42*     (2010.01)
*F16L 37/30*     (2006.01)
(Continued)

(52) U.S. Cl.
CPC ............... *B67D 7/42* (2013.01); *B67D 7/344* (2013.01); *F16L 37/30* (2013.01); *F16L 37/34* (2013.01);
(Continued)

(58) Field of Classification Search
CPC .. B67D 7/344; B67D 7/34; B67D 7/42; F16K 37/34; F16K 37/23
See application file for complete search history.

(56) References Cited

U.S. PATENT DOCUMENTS

| 2,473,973 A | 6/1949 | Scheiwer |
| 2,643,140 A * | 6/1953 | Scheiwer ............... F16L 37/23 |
| | | 137/614.04 |

(Continued)

FOREIGN PATENT DOCUMENTS

| GB | 1208942 A | 10/1970 |
| WO | 2014/087187 A1 | 6/2014 |

OTHER PUBLICATIONS

PCT/US2015/045343, "Notification of Transmittal of the International Search Report and the Written Opinion of the International Searching Authority, or the Declaration", dated Feb. 4, 2016.

*Primary Examiner* — Timothy L Maust
*Assistant Examiner* — Timothy P Kelly
(74) *Attorney, Agent, or Firm* — Kunzler, PC

(57) ABSTRACT

An apparatus and system are disclosed for fluid transfer. The apparatus includes a fluid receiver that includes a receiver base having an inlet and an outlet. The apparatus also includes a tubular cylinder having an inlet and an outlet, where the outlet of the tubular cylinder is coupled to the inlet of the receiver base. The tubular cylinder has a keyed outer surface, which in one embodiment, includes at least one surface feature extending annularly around the surface of the tubular cylinder. The surface feature engages with at least one tumbler in a fluid nozzle. The system includes the fluid receiver and a fluid nozzle. The fluid nozzle, in one embodiment, has an arrangement of tumblers that are positioned adjacent an inlet of the fluid nozzle and configured to engage the keyed outer surface of the fluid receiver.

18 Claims, 9 Drawing Sheets

(51) Int. Cl.
  *F16L 37/34* (2006.01)
  *F16L 37/36* (2006.01)
  *B67D 7/34* (2010.01)

(52) U.S. Cl.
  CPC ........... *F16L 37/36* (2013.01); *F16L 2201/20* (2013.01); *Y10T 137/87949* (2015.04); *Y10T 137/87973* (2015.04)

(56) References Cited

U.S. PATENT DOCUMENTS

| | | | |
|---|---|---|---|
| 3,112,767 A | 12/1963 | Cator | |
| 3,613,726 A | 10/1971 | Torres | |
| 3,880,214 A | 4/1975 | Slavin | |
| 4,086,939 A | 5/1978 | Wilcox et al. | |
| 4,219,048 A * | 8/1980 | Ekman | F16L 37/23 137/614.03 |
| 4,271,865 A | 6/1981 | Galloway et al. | |
| 4,290,440 A | 9/1981 | Sturgis | |
| 4,924,909 A | 5/1990 | Wilcox | |
| 5,094,491 A | 3/1992 | Berghammer et al. | |
| 5,179,976 A | 1/1993 | Boland et al. | |
| 5,211,197 A | 5/1993 | Marrison et al. | |
| 5,240,023 A | 8/1993 | Shelef et al. | |
| 5,323,812 A | 6/1994 | Wayne | |
| 5,390,963 A | 2/1995 | Namekawa | |
| 5,806,564 A | 9/1998 | Wilcox | |
| 5,971,019 A | 10/1999 | Imai | |
| 6,106,026 A | 8/2000 | Smith, III | |
| 6,283,151 B1 | 9/2001 | Countryman et al. | |
| 6,561,551 B2 | 5/2003 | Kawakami et al. | |
| 6,659,130 B2 | 12/2003 | Arosio | |
| 6,792,974 B2 | 9/2004 | Mikiya et al. | |
| 7,111,641 B2 | 9/2006 | Marban et al. | |
| 7,887,023 B2 | 2/2011 | Hasunuma | |
| 7,942,163 B2 | 5/2011 | Sauer | |
| 8,056,581 B2 | 11/2011 | Danielson et al. | |
| 8,196,606 B2 | 6/2012 | Kitagawa | |
| 8,256,803 B2 | 9/2012 | Takahashi | |
| 9,080,712 B2 | 7/2015 | Tiberghien et al. | |
| 9,601,838 B2 * | 3/2017 | Itou | H01R 4/22 |
| 9,708,173 B2 * | 7/2017 | Ballard | B67D 7/42 |
| 2003/0145892 A1 | 8/2003 | Maldavs | |
| 2007/0257485 A1 * | 11/2007 | Arosio | F16L 19/005 285/316 |
| 2010/0327574 A1 | 12/2010 | Takahashi | |
| 2013/0186495 A1 * | 7/2013 | Abura | F16L 37/28 137/798 |
| 2016/0047503 A1 | 2/2016 | Ballard et al. | |

* cited by examiner

NOZZLE AND KEYED FLUSH FACE RECEIVER

CROSS-REFERENCES TO RELATED APPLICATIONS

This application claims the benefit of and claims priority to U.S. Provisional Patent Application No. 62/037,598 entitled "NOZZLE AND KEYED FLUSH FACE RECEIVER" and filed on Aug. 14, 2014 for Mark Paul Ballard, et al., which is incorporated herein by reference.

FIELD

This invention relates to valve couplings, and more particularly to valve couplings for fluid transfer devices.

BACKGROUND

Valve couplings for fluid transfer devices are used for transferring fuels and lubricants from storage reservoirs or tanks to a corresponding tank on a self-propelled vehicle, such as heavy construction or earth-moving vehicle. A single heavy construction vehicle may utilize, for example, ten or more different types of fluids or lubricants. Examples of these fluids or lubricants can include, but are not limited to, hydraulic fluid, engine oil, transmission oil, differential oil, engine coolant, brake fluid, joint lubricants, etc.

Quick-connect valve couplings are useful when performing maintenance on the above described heavy construction vehicles to minimize the downtime of the construction vehicle. However, coupling the wrong nozzle to the wrong receiver can cause extensive damage to the construction vehicle by putting, for example, the wrong type of lubricant into the motor.

SUMMARY

An apparatus and system are disclosed for fluid transfer. The apparatus includes a fluid receiver that includes a receiver base having an inlet and an outlet. The apparatus also includes a tubular cylinder having an inlet and an outlet, where the inlet of the tubular cylinder is coupled to the outlet of the receiver base. The outlet of the tubular has a keyed outer surface, which in one embodiment, is at least one surface feature extending annularly around the surface of the tubular cylinder. The surface feature engages with at least one tumbler in a fluid nozzle.

In one embodiment, the at least one surface feature is one of a raised area or a recessed area with reference to an adjacent area of the keyed outer surface. In another embodiment, the apparatus includes a slidable poppet disposed within the tubular cylinder. The slidable poppet moves or transitions from an open position that allows fluid to flow through the fluid receiver, and a closed position that prevents fluid flow through the fluid receiver. The receiver base may include a poppet support rigidly formed in the outlet of the receiver base. The poppet support may include an opening for receiving a stem of the slidable poppet.

In another embodiment, the apparatus includes a spring disposed between the slidable poppet and the poppet support. The spring, in one example, urges the slidable poppet into the closed position. The apparatus may also include an O-ring disposed in an interior surface of the tubular cylinder outlet, the O-ring configured to form a seal between the slidable poppet and an interior surface of the tubular cylinder.

The apparatus, in one embodiment, may include a substantially planar nozzle-engaging face configured to engage a substantially planar face of a rigid poppet of the fluid nozzle. In one embodiment, the receiver base and the tubular cylinder form a fluid flow path through which fluid may flow from the inlet of the fluid receiver to the outlet of the tubular cylinder.

In another embodiment, the outlet of the receiver base comprises a threaded portion configured to engage a threaded portion of the tubular cylinder to secure the tubular cylinder to the receiver base. In an alternative embodiment, the tubular cylinder is integrally formed with the receiver base.

The system includes the fluid receiver and a fluid nozzle. The fluid nozzle, in one embodiment, has an arrangement of tumblers that are positioned adjacent an inlet of the fluid nozzle and configured to engage the keyed outer surface of the fluid receiver.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

The subject matter of the present application has been developed in response to the present state of the art, and in particular, in response to the problems and needs in the art that have not yet been fully solved by currently available fuel receivers. Accordingly, the subject matter of the present application has been developed to provide a fluid receiver that overcomes at least some shortcomings of the prior art.

Described herein are various embodiments of a flush faced coupling system. The flush faced coupling system includes a receiver component and a nozzle component. In one embodiment, the receiver component has a keyed exterior surface that engages a series of "tumblers" inside the nozzle. If the keyed exterior surface is a match with the arrangement of the tumblers, a connection is allowed such that fluid is able to flow from the nozzle into the receiver. The below described embodiments are applicable to dry-break systems, or in other words, systems that when disconnected do not leak fluid.

Figure 1:
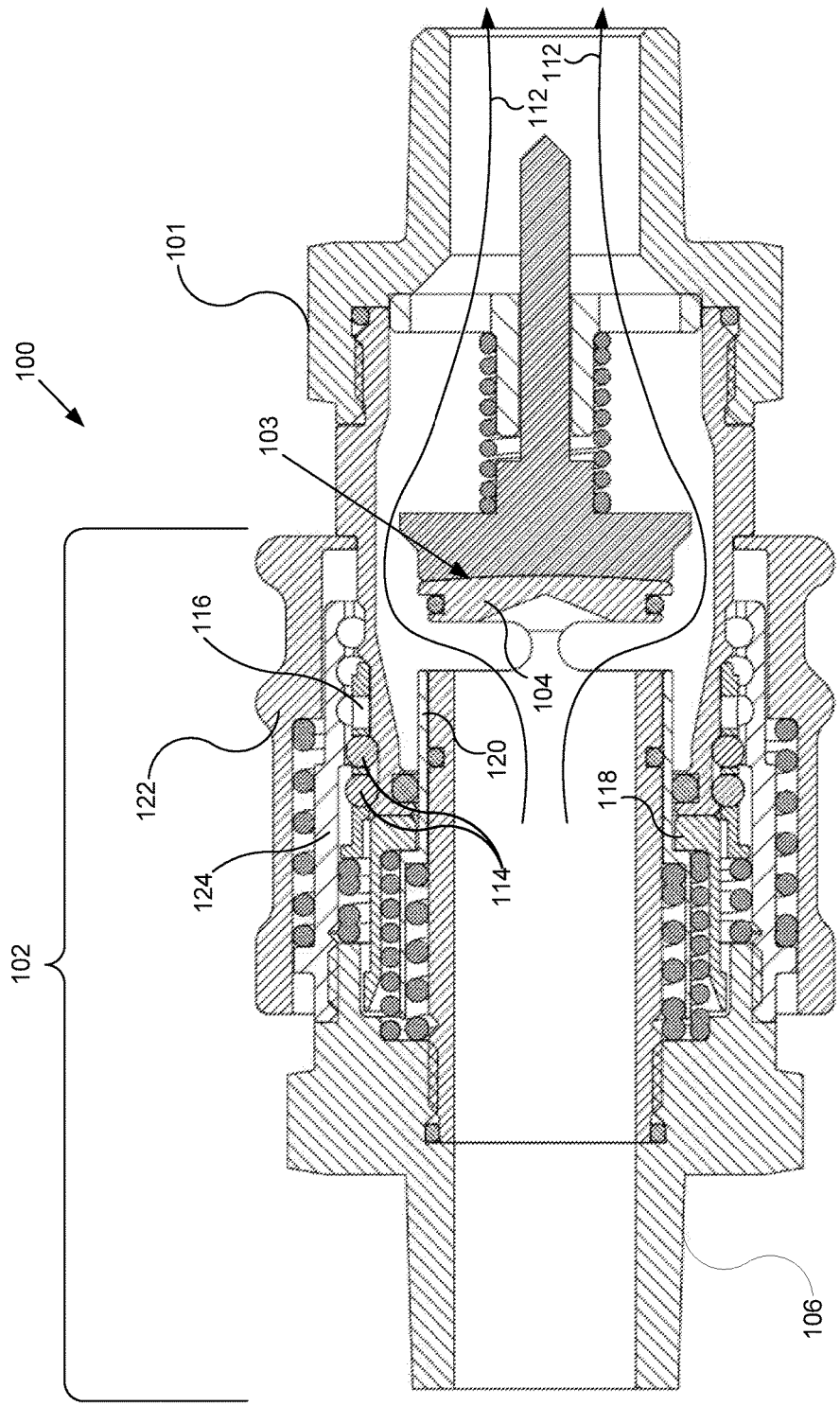
FIG. 1 is a schematic diagram illustrating one embodiment of a flush faced system in accordance with embodiments of the invention.

FIG. 1 is a schematic diagram illustrating one embodiment of a flush faced system 100 in accordance with embodiments of the invention. The flush faced system 100 is used for transferring fluids from supply tanks to, for example, various components of heavy construction and earth-moving equipment. The depicted flush faced system 100 is a push-to-connect coupling that automatically seals when disconnected. Additionally, the flush face coupling is easily cleaned before coupling a receiver 101 to a nozzle 102. For example, a worker may simply wipe his or her glove across either the face of a receiver 101 or a nozzle 102 to wipe fluid and/or debris from the "flush" surfaces 103.

The receiver 101 and the nozzle 102 are transitionable between open and closed states. An open state allows for the passage of a pressurized fluid, while the closed state does not. Each of the receiver 101 and the nozzle 102 include flush faced mating surfaces (identified by arrow 103) that form part of a valve assembly referred to as a poppet. The poppet 104 of the nozzle 102, in one embodiment, may be rigidly coupled with the nozzle base 106. In a further embodiment, the poppet 108 of the receiver 101 is movable with relation to the receiver 101.

Heavy construction equipment may require up to 10 different types of couplings (i.e., receiver 101 and nozzle 102) for each of the different types of lubricating oil and/or hydraulic fluid. Extensive damage can occur if the wrong component of the heavy construction equipment is lubricated with the wrong fluid. For this reason, a receiver with a keyed exterior surface is provided. As will be described below, the keyed exterior surface is configured to engage a series of "tumblers" to open a passageway in the nozzle 102 through which a fluid may flow.

FIG. 1 is a depiction of a coupling system 100 having a receiver 101 with a keyed exterior surface that is configured to properly engage the tumblers. Arrows 112 depict the direction of fluid flow through the coupling when the keyed exterior surface properly engages the tumblers. In one embodiment, the tumblers are balls 114 disposed in openings within a ball ring 116. The ball ring 116 is substantially tubular and disposed on an exterior surface of seal ring 118. The seal ring 118, likewise, is substantially tubular and disposed between the ball ring 116 and a poppet sleeve 120. The poppet sleeve 120, in one embodiment, slideably engages the nozzle poppet 104 to slide between an open position, as depicted, and a closed position that prohibits the flow of fluid through the nozzle 102. A pull-back collar 122 is disposed around the outside of a nose collar 124. The function of the above described components will be described below in greater detail.

Figure 2:
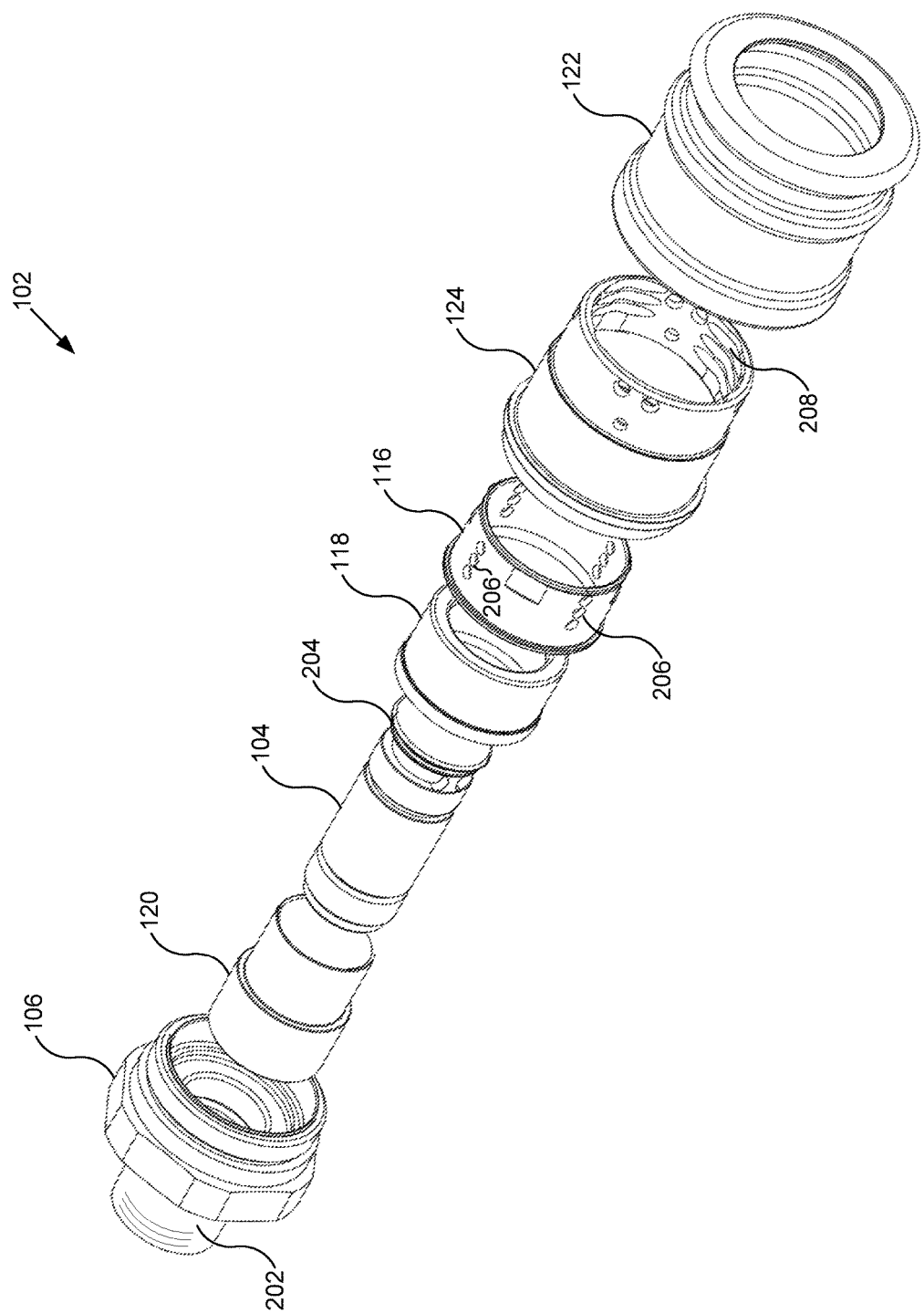
FIG. 2 is a perspective exploded view diagram of the nozzle, in accordance with embodiments of the present disclosure.

FIG. 2 is a perspective exploded view diagram of the nozzle 102, in accordance with embodiments of the present disclosure. As described, the nozzle 102 includes the nozzle base 106. In one embodiment, the nozzle base 106 may include a threaded cylinder 202 for coupling to other devices. The threads may be on an exterior surface for coupling to fluid tanks, or internal threads for coupling with, for example, a hose. For convenience, the nozzle base 106 may include a hexagonal shape for turning with conventional wrenches. The nozzle base 106 includes various internal shoulders and ridges for rigidly receiving the poppet 104. The nozzle base 106 includes areas for receiving various springs (see FIG. 1) that bias the moveable components (i.e., poppet sleeve 120, seal ring 118, ball ring 116, etc.). Also depicted are various grooves 204 for receiving O-rings that form seals between the moving parts.

The seal ring 118 is configured to form, with the poppet 104, part of the exterior flush face surface. The seal ring 118 is also configured to slide towards the nozzle base 106 and cause the poppet sleeve 120 to move from an open position to a closed position. The seal ring 118 forms part of the flush face of the nozzle 102. Each of the ball ring 116 and the nose collar 124 are disposed between the seal ring 118 and the pull-back collar 122. The tumblers, or balls, are housed in openings 206 in the ball ring 116. As will be described in greater detail below, the tumblers prevent the receiver from fully displacing the seal ring 118 and subsequently the poppet sleeve 120 unless the receiver 101 is keyed to allow the tumblers to "fall."

The nose collar 124, in one embodiment, includes a series of annular grooves 208 that maintain the position of the tumblers in the openings 206. The grooves 208, in one embodiment, have a shallower depth at the distal ends than in the middle. Beneficially, this prevents rotation of the nose collar 124 with respect to the ball ring 116 because the tumblers are substantially maintained within the middle area of the grooves 208. Accordingly, the tumblers are prevented from being removed accidentally from the ball ring 116. Other depicted grooves and openings in the nose collar 124 are useful for locking the pull-back collar 122 into position.

Figure 3:
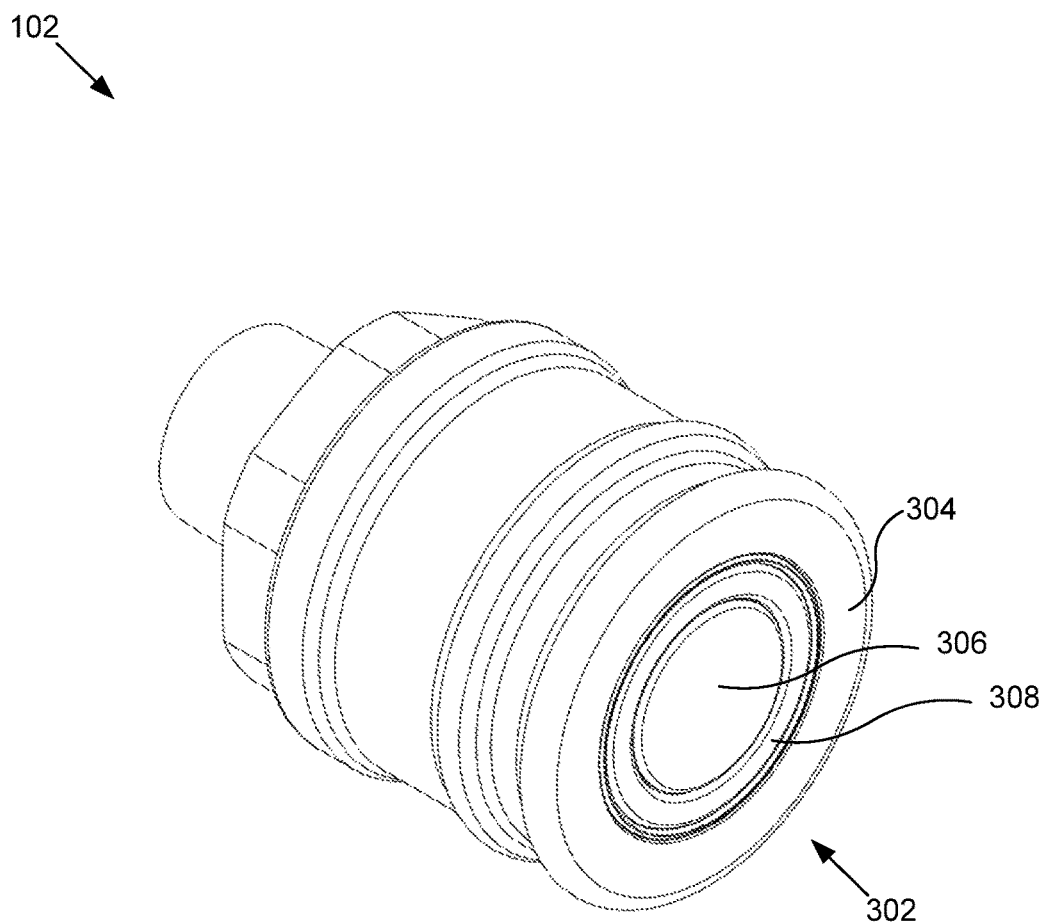
FIG. 3 is a perspective view diagram illustrating one embodiment of the nozzle in accordance with embodiments of the present disclosure.

FIG. 3 is a perspective view diagram illustrating one embodiment of the nozzle 102 in accordance with embodiments of the present disclosure. In the depicted embodiment, the nozzle 102 is formed having the above described "flush face" 302. Accordingly, a worker may simply wipe the face 302 of the nozzle 102 before attempting to connect the receiver. The flush face 302 is formed by a pull-back collar end surface 304, a poppet end surface 306, and a seal ring end surface 308.

Figure 4A:
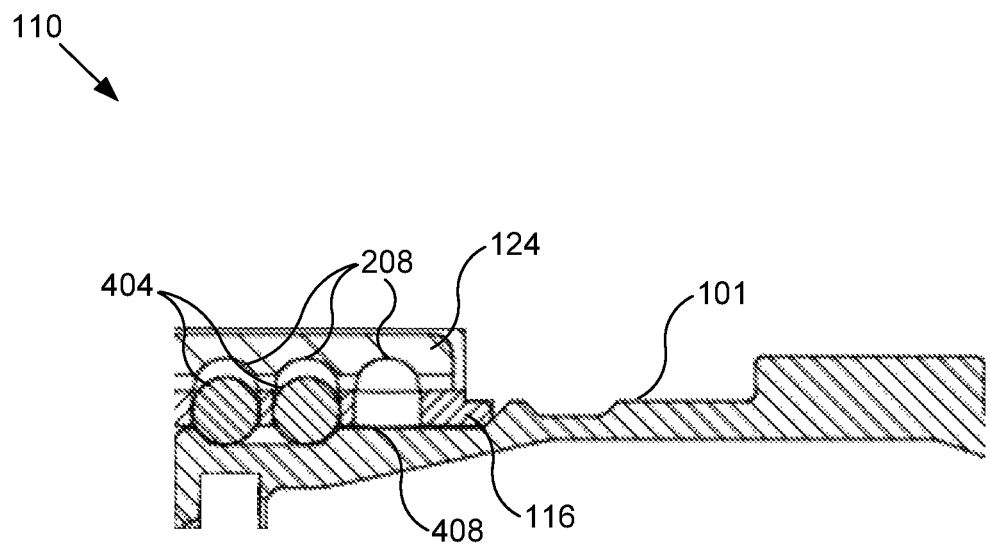
FIGS. 4a and 4b are partial depictions of the keyed receiver, ball ring and nose collar.
Figure 4B:
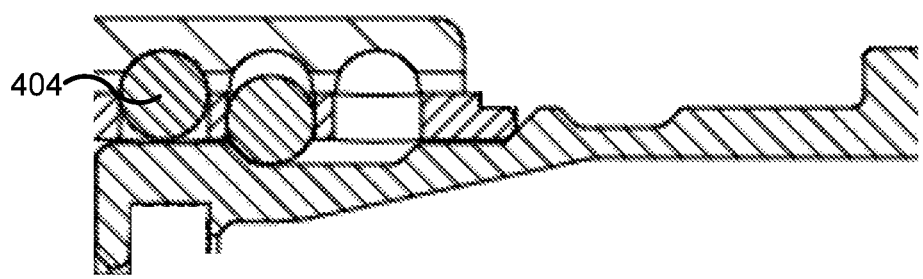

FIGS. 4a and 4b are partial depictions of the keyed receiver 101, ball ring 116 and nose collar 124. FIG. 4a depicts a receiver 101 that is keyed to engage the tumblers 404, while FIG. 4b depicts a receiver 101 that is not configured to engage the tumblers 404. As described previously, the grooves 208 maintain the position of the tumblers 404 with respect to the ball ring 116. As the receiver is pushed into the nozzle 102, the keyed surfaces in the receiver 101 either lift the tumblers 404 into the grooves 208, or allow the tumblers to "fall." If any of the tumblers are lifted into the grooves 208, then the ball ring 116 locks to the nose collar 124, and the nozzle remains in a closed or locked state and fluid is not allowed to transfer through the receiver or the nozzle. This feature, beneficially, prevents a worker or user from connecting the wrong receiver to the wrong nozzle. This is depicted in FIG. 4b. The cross-sectional profile of the receiver 101 includes a raised portion 408 that lifts the tumbler 404 into the groove 208 and prevents the receiver 101 from coupling to the nozzle 102.

Although the keyed surfaces of FIGS. 4a and 4b are depicted as linear representations (i.e., cross-sectional views) for clarity, it is to be understood that the keyed surfaces extend around the entire exterior surface of the receiver 101. As such, the receiver 101 and the nozzle 102 may be coupled at any angle of rotation relative to each other. In other words, the receiver 101 does not need to be indexed or clocked relative to the nozzle 102 in a particular position. As used herein, the words or phrases mentioning "key" or "keyed" refer to a surface containing features that are configured to engage or disengage the tumblers and either lock or unlock the ball ring with respect to the nose collar. The features, for example, may include notches, grooves, ridges, plateaus, etc., or any other raised or lowered elevation profile, that either allow the tumblers to "lift" and engage the nose collar 124 or "fall" and allow the ball ring 116 to move with respect to the nose collar 124.

Figure 5:
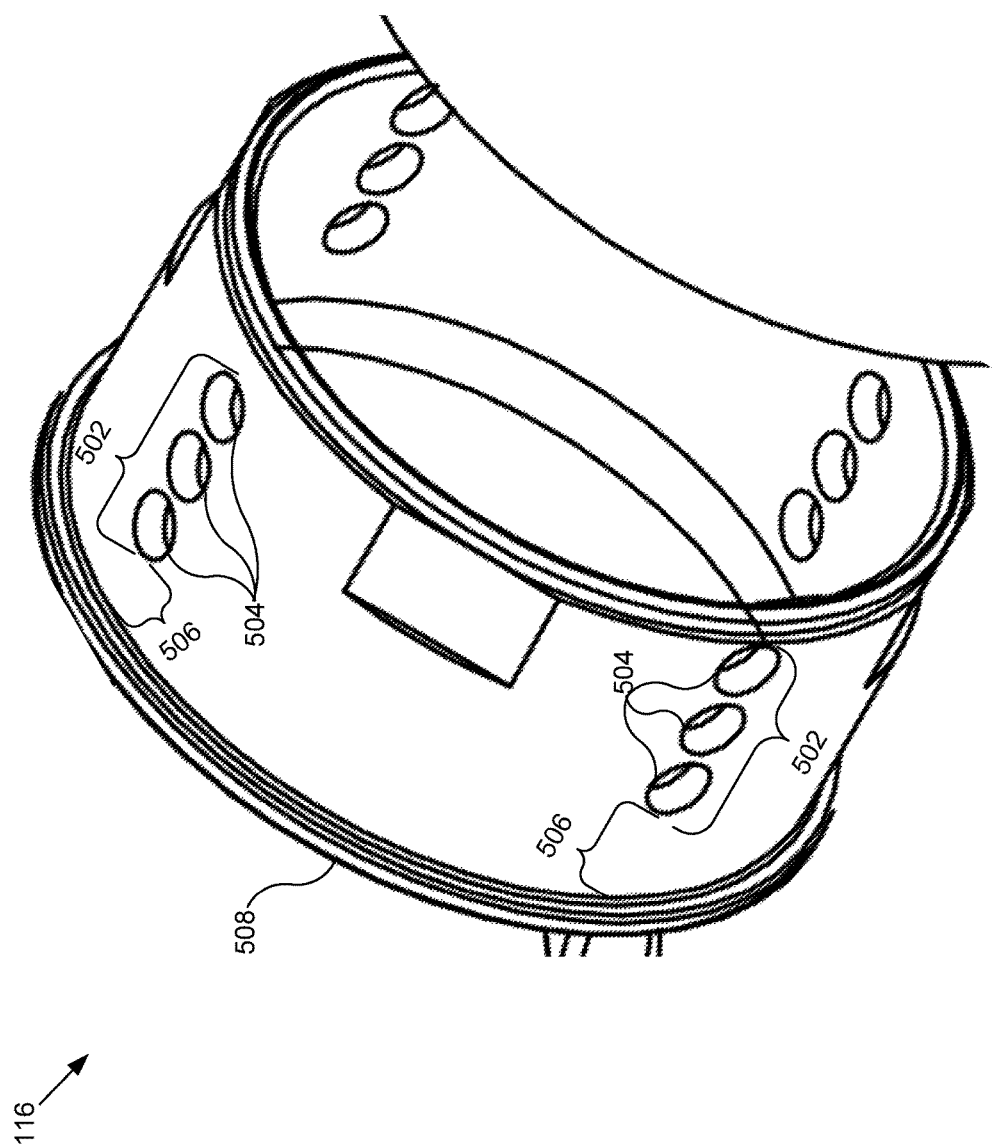
FIG. 5 is a perspective view diagram of the ball ring in accordance with embodiments of the present disclosure.

FIG. 5 is a perspective view diagram of the ball ring 116 in accordance with embodiments of the present disclosure. The ball ring 116 may be configured with multiple series 502 of offset openings 504. Each series may be positioned at a distance 506 from a collar 508 of the ball ring 116. By offsetting the series 502 of openings, a greater number of unlock combinations may be achieved. In other words, a greater number of unique nozzle/receiver combinations are achieved. The number of different combinations depends on the number of series 502 and number of openings within each series 502.

In the depicted embodiment, each series 502 is disposed adjacent another series 502 having a different offset 506 from the collar 508. In a further embodiment, each series is disposed opposite a series with the same offset 506. The depicted embodiment has two sets of identically offset series, each series having three openings. A tumbler may be placed in each opening. Additionally, the series 502 of opening may be oriented in a line, as depicted, that is substantially parallel to a direction of insertion of the fuel receiver, or fluid flow. In other words, the series 502 of opening line up with the direction of movement that the fluid nozzle and fluid receiver move with respect to each other.

In an alternative embodiment, only one or two of the openings of each series 502 may have a tumbler. In yet another embodiment, each series 502 includes at least two tumblers. The combination of "present" and "absent" tumblers across the different series 502 enable a plurality of different possible receiver/nozzle combinations. For example, in the depicted embodiment, up to 15-20 different unique keyed receivers may be configured. In a further embodiment, each series 502 may include only a single opening. Although this results in fewer different unique combinations, there are situations where only a few different receiver/nozzle combinations are desirable.

Figure 6:
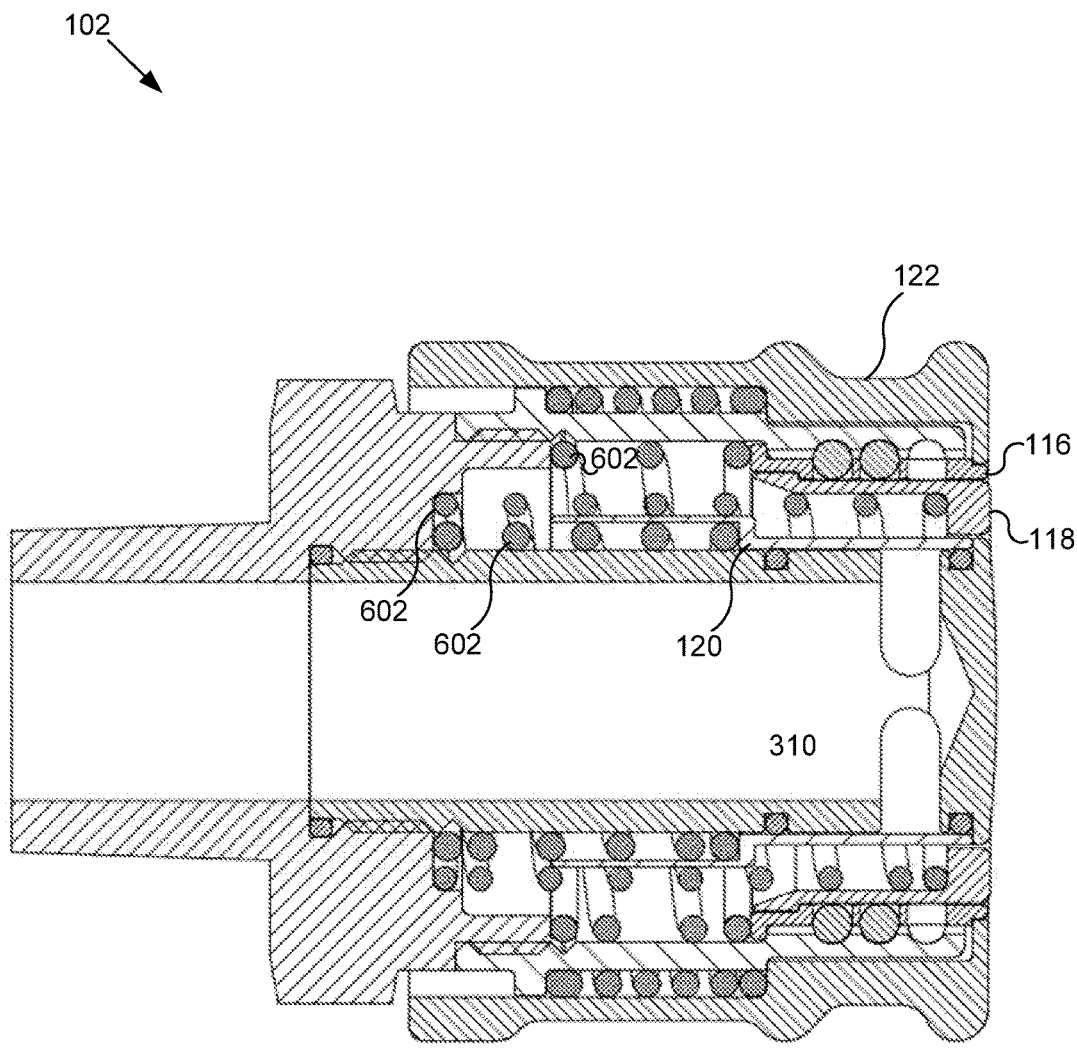
FIG. 6 is another cross-sectional diagram of the nozzle in accordance with embodiments of the present disclosure.

FIG. 6 is another cross-sectional diagram of the nozzle 102 in accordance with embodiments of the present disclosure. The depicted nozzle 102 is in a closed state, such as before someone attempts to connect the nozzle 102 with a receiver. Also depicted are the various spring members 602 that bias the ball ring 116, seal ring 118, poppet sleeve 120, and pull-back collar 122. Each spring may have a strength in the range of between about 1 and 15 pounds.

Figure 7:
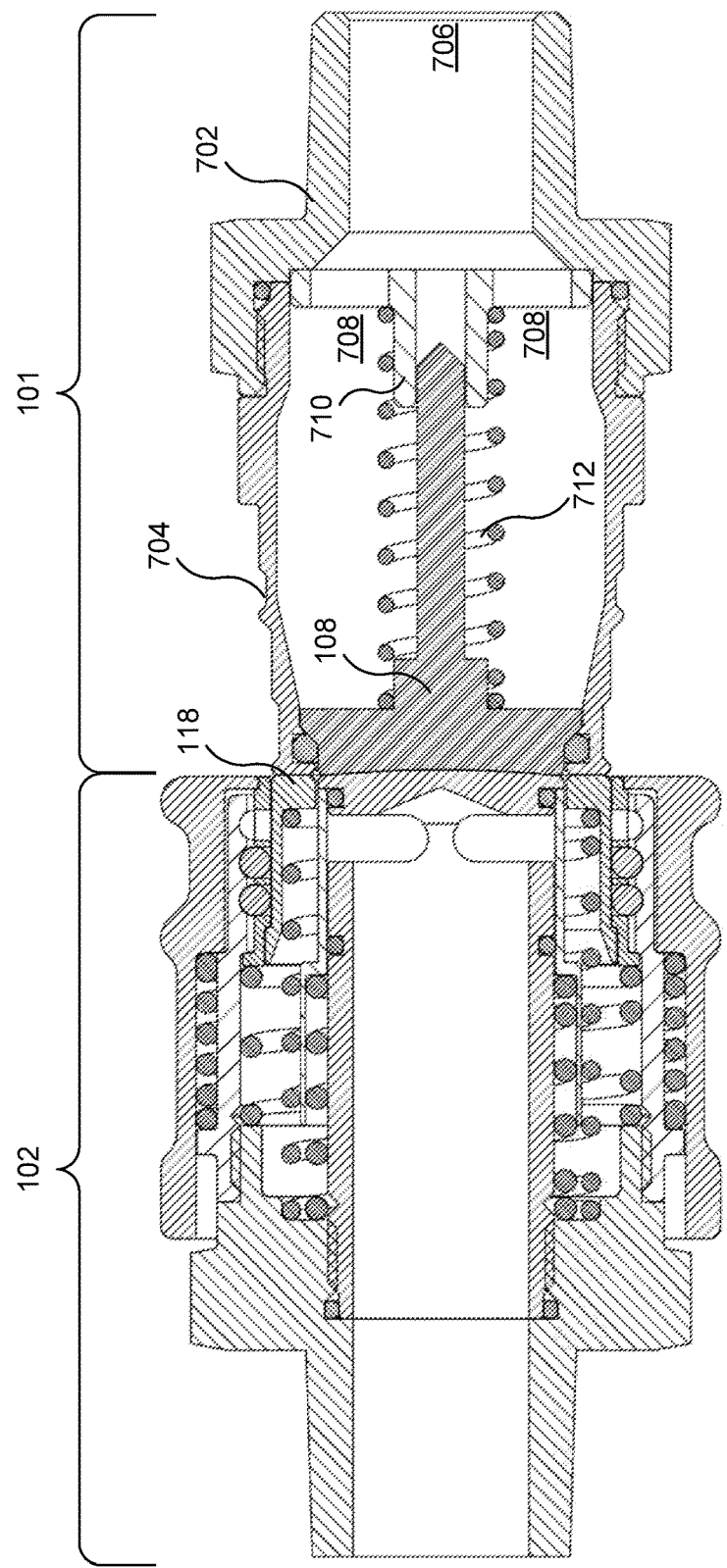
FIG. 7 is a cross-sectional diagram illustrating one embodiment of the nozzle and receiver in accordance with embodiments of the present disclosure.

FIG. 7 is a cross-sectional diagram illustrating one embodiment of the nozzle 102 and receiver 101 in accordance with embodiments of the present disclosure. In the depicted embodiment, the receiver 101 and the nozzle 102 are in a disengaged state. The flush faces of the poppets have mated (or touched), but the receiver 101 has not further engaged the seal ring 118. Thus, in the depicted embodiment, fluid is not flowing through the receiver or the nozzle.

As described above, the fuel receiver 101 comprises, in one embodiment, a receiver base 702 coupled with a tubular cylinder 704. The receiver base 702 includes an outlet 706 and an inlet 708. The tubular cylinder 704 is coupled with the inlet 708 of the receiver base 702. In one embodiment, the tubular cylinder 704 includes a threaded section that engages a threaded section of the receiver base 702 to couple the tubular cylinder 704 to the receiver base 702. In an alternative embodiment, the tubular cylinder 704 is integrally formed with the receiver base 702. The outlet 706 of the receiver base 702 may be coupled with a fluid hose (not shown) or a storage tank.

Formed in the outlet of the receiver base 702 is a poppet support 710. The poppet support engages the slidable poppet 108 and forms a rigid base upon which a spring 712 may be mounted. The spring 712 biases the slidable poppet 108 and urges the slidable poppet to move to a default, normally closed position, as depicted in FIG. 7. The slidable poppet 108, however, is movable between the closed position and an open position which allows the transfer of fluid through the receiver 101.

Figure 8:
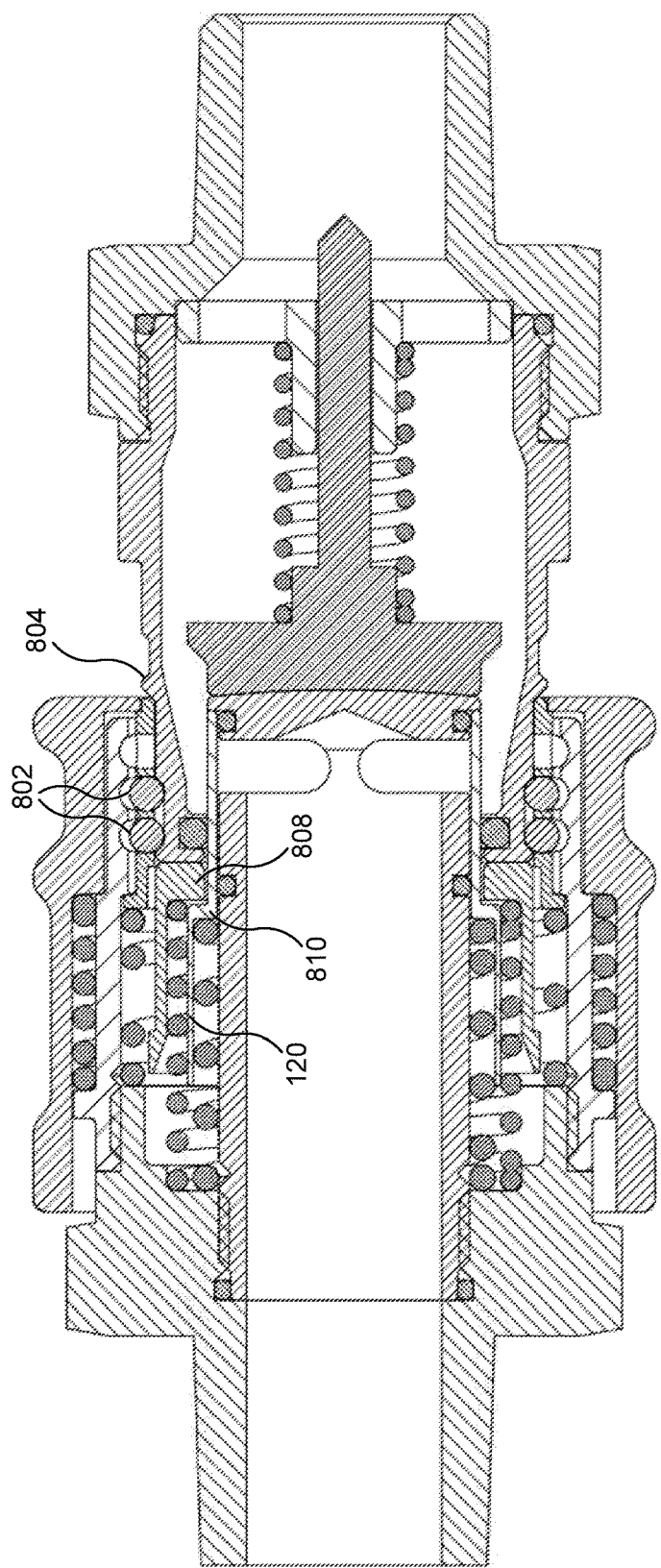
FIG. 8 is a cross-sectional diagram illustrating one of the states of the receiver and the nozzle.

FIG. 8, like FIG. 7, is a cross-sectional diagram illustrating one of the states of the receiver 101 and the nozzle 102. In the depicted embodiment, the receiver 101 has a keyed exterior surface that aligns with the tumblers 802. As described above, the ball ring may have a series of openings with tumblers in two of the three openings. The receiver 101 has a keyed surface that corresponds with the two tumblers 802, allowing the tumblers to fall into the keyed surface 802 of the receiver 101. With the tumblers 802 in a retracted/fallen position, a shoulder 804 of the receiver 101 may push the ball ring 116 and the seal ring 118 towards the nozzle base 106. Once a shoulder 808 of the seal ring engages a corresponding shoulder 810 of the poppet sleeve 120, the poppet sleeve 120 compresses a spring and slides towards the nozzle base 106, opening a pathway for fluid to flow through the receiver 101 and nozzle 102.

Figure 9:
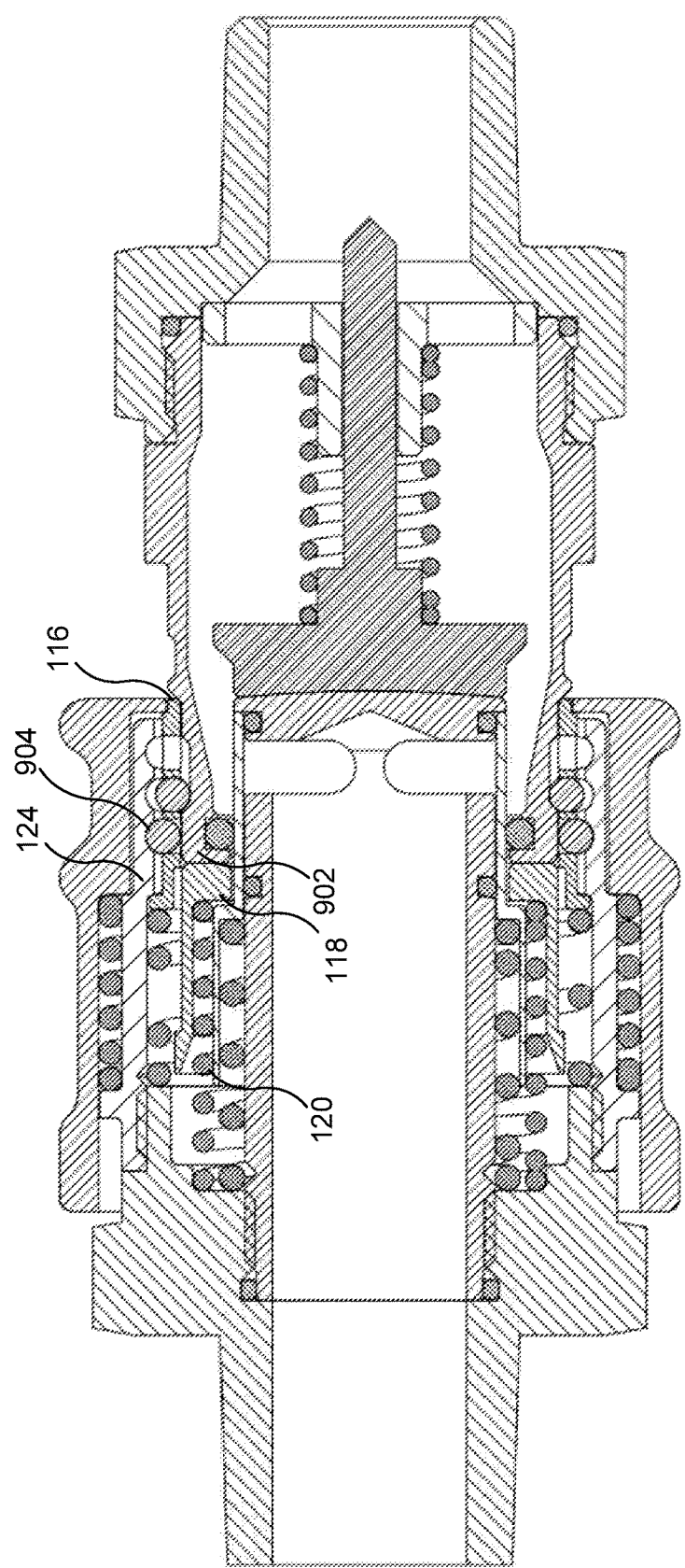
FIG. 9 is a cross sectional diagram illustrating a failed engaged state of the receiver and nozzle.

FIG. 9 is a cross sectional diagram illustrating a failed engaged state of the receiver 101 and nozzle 102. In the depicted embodiment, the keyed surface of the receiver 101 does not correspond to the position and placement of the tumblers. In particular, the keyed surface has a raised area 902 that corresponds with a tumbler 904. As such, the tumbler 904 does not retract/fall out of engagement with the nose collar 124 and the ball ring 116 remains locked relative to the nose collar 124. This prevents the receiver 101 from further engaging the seal ring 118, and as such, the poppet sleeve 120 does not move. This desired effect prevents a user from putting the wrong fluid into the nozzle 102.

The components described above may be formed of a rigid material capable of withstanding the forces associated with rapidly flowing fluids. Examples of a rigid material suitable for use include, but are not limited to, aircraft grade aluminum that may be anodized, stainless steel (e.g., grade 416, or 303) or, nickel-plated steel. The nozzle and receiver are generally formed in the shape of a tube, having first and second openings at opposite ends to serve as inlets and outlets for fuel or other fluids.

As used herein, the phrase "open position" refers to an operating mode wherein fuel or fluid is allowed to flow. Similarly, the phrase "closed position" refers to an operating mode wherein the flow of fuel or fluid is impeded.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Furthermore, the details, including the features, structures, or characteristics, of the subject matter described herein may be combined in any suitable manner in one or more embodiments. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid receiver comprising:
a receiver base having an inlet and an outlet; and
a tubular cylinder having an inlet and an outlet, where the outlet of the tubular cylinder is coupled to the inlet of the receiver base, where tubular cylinder has a keyed outer surface comprising at least one surface feature extending annularly around the surface of the tubular cylinder that is configured and positioned to selectively engage with at least one tumbler in a fluid nozzle to allow a flow of fluid in response to the at least one tumbler being positioned correspondingly, and to not engage with the at least one tumbler and prevent the flow of fluid in response to the at least one tumbler not being positioned correspondingly.

2. The fluid receiver of claim 1, where the at least one surface feature is one of a raised area or a recessed area with reference to an adjacent area of the keyed outer surface.

3. The fluid receiver of claim 1, further comprising a slidable poppet disposed within the tubular cylinder and configured to transition from an open position that allows the flow of fluid through the fluid receiver, and a closed position that prevents the flow of fluid through the fluid receiver.

4. The fluid receiver of claim 3, further comprising a poppet support rigidly formed in the inlet of the receiver base, where the poppet support comprises an opening for receiving a stem of the slidable poppet.

5. The fluid receiver of claim 4, further comprising a spring disposed between the slidable poppet and the poppet support.

6. The fluid receiver of claim 5, where the spring is configured to urge the slidable poppet into the closed position.

7. The fluid receiver of claim 6, further comprising an O-ring disposed in an interior surface of the tubular cylinder outlet, the O-ring configured to form a seal between the slidable poppet and an interior surface of the tubular cylinder.

8. The fluid receiver of claim 7, where the slidable poppet comprises a substantially planar nozzle-engaging face configured to engage a substantially planar face of a rigid poppet of the fluid nozzle.

9. The fluid receiver of claim 1, where the receiver base and the tubular cylinder form a fluid flow path through which the fluid may flow from the inlet of the tubular cylinder to the outlet of the receiver base.

10. The fluid receiver of claim 8, where the inlet of the receiver base comprises a threaded portion configured to engage a threaded portion of the tubular cylinder to secure the tubular cylinder to the receiver base.

11. The fluid receiver of claim 8, where the tubular cylinder is integrally formed with the receiver base.

12. A keyed tubular cylinder comprising:
an inlet and an outlet;
an outer surface comprising at least one surface feature extending annularly around the outer surface and configured and positioned to selectively engage with at least one tumbler in a fluid nozzle to allow a flow of fluid in response to the at least one tumbler being positioned correspondingly, and to not engage with the at least one tumbler and prevent the flow of fluid in response to the at least one tumbler not being positioned correspondingly.

13. The keyed tubular cylinder of claim 12, where the at least one surface feature is one of a raised area or a recessed area with reference to an adjacent area of the outer surface.

14. The keyed tubular cylinder of claim 12, further comprising a receiver base coupled to the outlet and having a poppet support formed in an inlet of the receiver base, where the keyed tubular cylinder forms a fluid receiver with the receiver base.

15. The keyed tubular cylinder of claim 14, a slidable poppet disposed within the keyed tubular cylinder that engages the poppet support, where the slidable poppet is configured to transition from an open position that allows the flow of fluid through the fluid receiver, and a closed position that prevents the flow of fluid through the fluid receiver.

16. The keyed tubular cylinder of claim 15, further comprising a spring disposed between the slidable poppet and the poppet support.

17. The keyed tubular cylinder of claim 16, where the spring is configured to urge the slidable poppet into the closed position.

18. The keyed tubular cylinder of claim 17, where the receiver base and the tubular cylinder form a perimeter of a fluid flow path through which the fluid may flow from the inlet of the tubular cylinder to the outlet of the receiver base.

\* \* \* \* \*